US006549299B1

(12) United States Patent
Allen et al.

(10) Patent No.: US 6,549,299 B1
(45) Date of Patent: Apr. 15, 2003

(54) INTEGRATED DOCUMENT CREATION AND FINISHING USING STANDALONE FINISHING DEVICES

(75) Inventors: Ross R. Allen, Belmont, CA (US); Per Gunnar Lundgren, Meridian, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 0 days.

(21) Appl. No.: 09/528,707

(22) Filed: Mar. 17, 2000

(51) Int. Cl.[7] ........ G06K 15/00

(52) U.S. Cl. ........ 358/1.18

(58) Field of Search ........ 399/84, 38, 45, 399/82, 83; 270/1.02, 1.03; 358/1.1, 1.4, 1.6, 1.13, 1.15, 1.18

(56) References Cited

U.S. PATENT DOCUMENTS

| | | | | |
|---|---|---|---|---|
| 4,603,971 | A | 8/1986 | Kukucka et al. | 355/133 |
| 4,716,438 | A | 12/1987 | Farrell | 355/6 |
| 4,944,031 | A | 7/1990 | Yoshino et al. | 355/206 |
| 4,970,554 | A | 11/1990 | Rourke | 355/202 |
| 4,987,447 | A | 1/1991 | Ojha | 355/204 |
| 4,989,852 | A | 2/1991 | Gunther, Jr. | |
| 5,067,835 | A | 11/1991 | Yamamoto et al. | 400/582 |
| 5,114,128 | A | 5/1992 | Harris, Jr et al. | |
| 5,130,806 | A | 7/1992 | Reed et al. | 358/296 |
| 5,207,412 | A | 5/1993 | Coons, Jr. et al. | 270/1.1 |
| 5,243,381 | A | 9/1993 | Hube | 355/204 |
| 5,274,468 | A | 12/1993 | Ojha | 358/448 |
| 5,316,279 | A | 5/1994 | Corona et al. | 270/1.1 |
| 5,461,469 | A | 10/1995 | Farrell et al. | 355/321 |
| 5,489,763 | A | 2/1996 | Conrad et al. | 235/384 |
| 5,564,109 | A | 10/1996 | Snyder et al. | 395/828 |
| 5,615,015 | A | 3/1997 | Krist et al. | 358/296 |
| 5,629,775 | A | 5/1997 | Platteter et al. | 358/296 |
| 5,715,381 | A | 2/1998 | Hamilton | 395/114 |
| 5,729,350 | A | 3/1998 | Ozaki | 358/296 |
| 5,746,162 | A | 5/1998 | Hosoi et al. | 123/58.09 |
| 5,826,869 | A | 10/1998 | Nyffenegger et al. | 270/52.02 |

FOREIGN PATENT DOCUMENTS

| | | |
|---|---|---|
| DE | 3244587 A1 | 9/1983 |
| DE | 3806125 A1 | 9/1989 |
| EP | 0439257 A2 | 7/1991 |
| EP | 1096781 A2 | 5/2001 |
| GB | 2063763 A | 6/1981 |
| WO | WO99/36338 | 7/1999 |
| WO | WO00/18583 | 4/2000 |
| WO | 0992365 A1 | 4/2000 |

*Primary Examiner*—Arthur G. Evans

(57) ABSTRACT

A document printing and finishing system includes a computer and a standalone finishing machine. The computer is used to print individual sheets that are to be assembled into a finished document by the finishing machine. In addition, the computer prompts its operator for finishing instructions, and then prints an instruction sheet setting forth such finishing instructions. In addition to being set forth in human-readable terms, the instructions are recorded in barcode form or some other format that is easily readable by a computer-based device. After the document sheets and instruction sheet have been printed, an operator submits them to the finishing machine. The finishing machine scans and decodes the instructions from the instruction sheet and automatically configures itself to finish the document in the manner prescribed by the instruction sheet.

32 Claims, 6 Drawing Sheets

INTEGRATED DOCUMENT CREATION AND FINISHING USING STANDALONE FINISHING DEVICES

TECHNICAL FIELD

The invention relates to machines and systems for finishing documents such as by stapling, folding, binding and otherwise processing multiple document sheets.

BACKGROUND

Various machinery exists for creating books, booklets, folders, leaflets and other documents made from one or more paper sheets. Such machinery, often referred to as "finishing" machinery, is able to perform various types of operations such as trimming, folding, stapling, saddle stapling, spiral-back binding, glue binding, etc.

Many finishing machines are extremely flexible, and can be dynamically configured to assemble many different document configurations. The machines are typically configured by an operator, who specifies variable parameters such as size, number of sheets per document, locations of folds, stapling or binding details, etc.

The capabilities of these machines of course vary with cost and complexity of the machines. Higher-end machines perform both printing and finishing, allowing an operator to specify printing and finishing configuration parameters from a single user interface. In other cases, individual document sheets are printed, collected by an operator, and then manually submitted to a standalone finishing machine. The term "standalone" is used to describe finishing machines that are not under control of the same computer or processor that produces the printed document sheets.

There are advantages to standalone finishing machines. One advantage is that they can be used to assemble document sheets regardless of the system used to print the sheets. Another advantage is that standalone finishing machines are often less expensive than machines that have integrated printing capabilities.

One disadvantage of standalone finishing machines, however, is that they do not normally permit a single user interface through which both printing and finishing parameters can be specified. In most cases, the printing operation is performed with a device such as a desktop computer and associated printer. Once the document sheets are printed, they are manually transferred to the finishing machine, which must then be independently configured to appropriately assemble the printed sheets into a finished document.

This process presents a significant potential for confusion and error. In many cases, the finishing machine is operated by someone other than the person who printed the sheets. In these cases, instructions for document finishing are often given orally. This can be a significant source of confusion. In other cases, a single operator might be responsible for both printing and finishing. Even so, the necessity of configuring two incompatible systems (the printing system and the finishing system) often results in configuration errors.

SUMMARY

In accordance with the invention, individual sheets of a document are printed by a computer and then submitted to a standalone finishing machine. In conjunction with printing the individual sheets, the computer prompts the operator for finishing instructions and then prints an instruction sheet to accompany the individual document sheets. Alternatively, the instructions might be printed on each sheet, in a location that will eventually be hidden in binding or trimmed. The instruction sheet has finishing instructions in machine-readable format such as in a barcode. The instructions specify parameters related to finishing, such as paper size, binding type, binding details, page number in a sequence, trimming parameters, etc. When the sheets are submitted to the finishing machine, the finishing machine first scans the machine-readable instructions. The finishing machine then configures itself in accordance with the instructions and finishes the specified documents accordingly.

In addition to the instruction sheet, it is desirable for the computer to place marks in each document sheet, indicating any special processing that is to be performed on that sheet and also indicating the relative position of the sheet relative to other sheets. This allows the finishing machine to implement special handling for individual sheets and to detect out-of-sequence sheets. The marks are preferably positioned to be inconspicuous in the final assembled document. Alternatively, the marks are made using an ink that is not visible to the unaided human eye.

DETAILED DESCRIPTION

Figure 1:
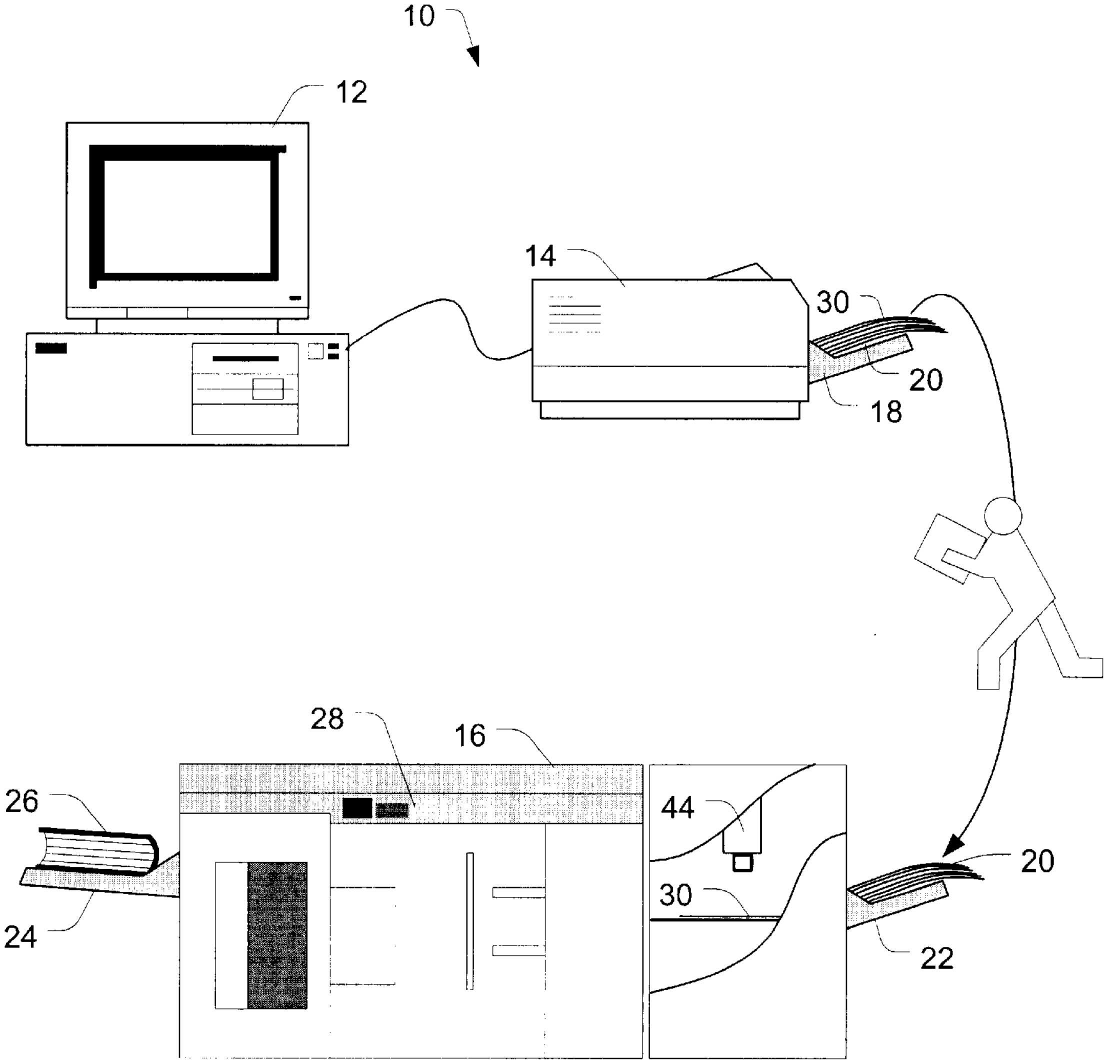
FIG. 1 is a diagram showing components of a document printing and finishing system in accordance with an embodiment of the invention.

FIG. 1 illustrates a document printing and finishing system 10 in accordance with the invention, for printing and finishing documents. In this disclosure, the term "document" refers to an assembly of one or more printed sheets of paper or other sheet-like materials. Generally, individual document sheets are folded and/or bound together to form a document having multiple pages. Document binding might be by stapling, gluing, or other means.

Printing and finishing system 10 comprises a computer 12, an associated printer 14, and a standalone document finishing machine 16. The computer in the described embodiment is a typical and commonly available desktop computer. The printer is preferably a high-resolution and high-speed laser printer, although a variety of different printers—including inkjet printers—can be utilized in accordance with the invention. The printer is connected to a serial or parallel communications port of computer 12, to print individual document sheets under direct control of computer 12. Alternatively, the computer and printer might communicate over a local area network. In either case, computer 12 is able to send print commands to printer 14 and to thereby produce black-and-white and/or color images on individual document sheets. The printer has an output tray 18 into which a plurality of document sheets 20 are placed after they have been printed. The printer typically has duplex printing capability either by means of an automatic duplexer or by manual intervention.

Document finishing machine 16 is a standalone machine, meaning that it is not under direct control of the apparatuses (in this case computer 12 and printer 14) being used to print document sheets 20. The document finishing machine has an input tray 22 which accepts sheets that are to be finished. The document finishing machine has an output tray 24 upon which finished documents 26 are deposited after processing by the document finishing machine. An operator control panel 28 is available for configuration of the finishing machine.

In accordance with the invention, computer 12 is programmed to print document sheets, with printer 14, for one or more documents. Generally, a set of document sheets forms a print job or finishing job. Each job contains sheets for one or a plurality of identical documents.

In addition, the computer is programmed to print a computer-readable instruction sheet 30 containing computer-readable finishing instructions regarding the document or documents that are to be assembled or finished. These instructions indicate various things about the tasks that are to be subsequently performed by the finishing machine, such as the locations of folds, binding details, paper size, trimming details, the number of pages in each document, page numbers of individual pages in a sequence, paper thickness (weight), etc.

Figure 2:
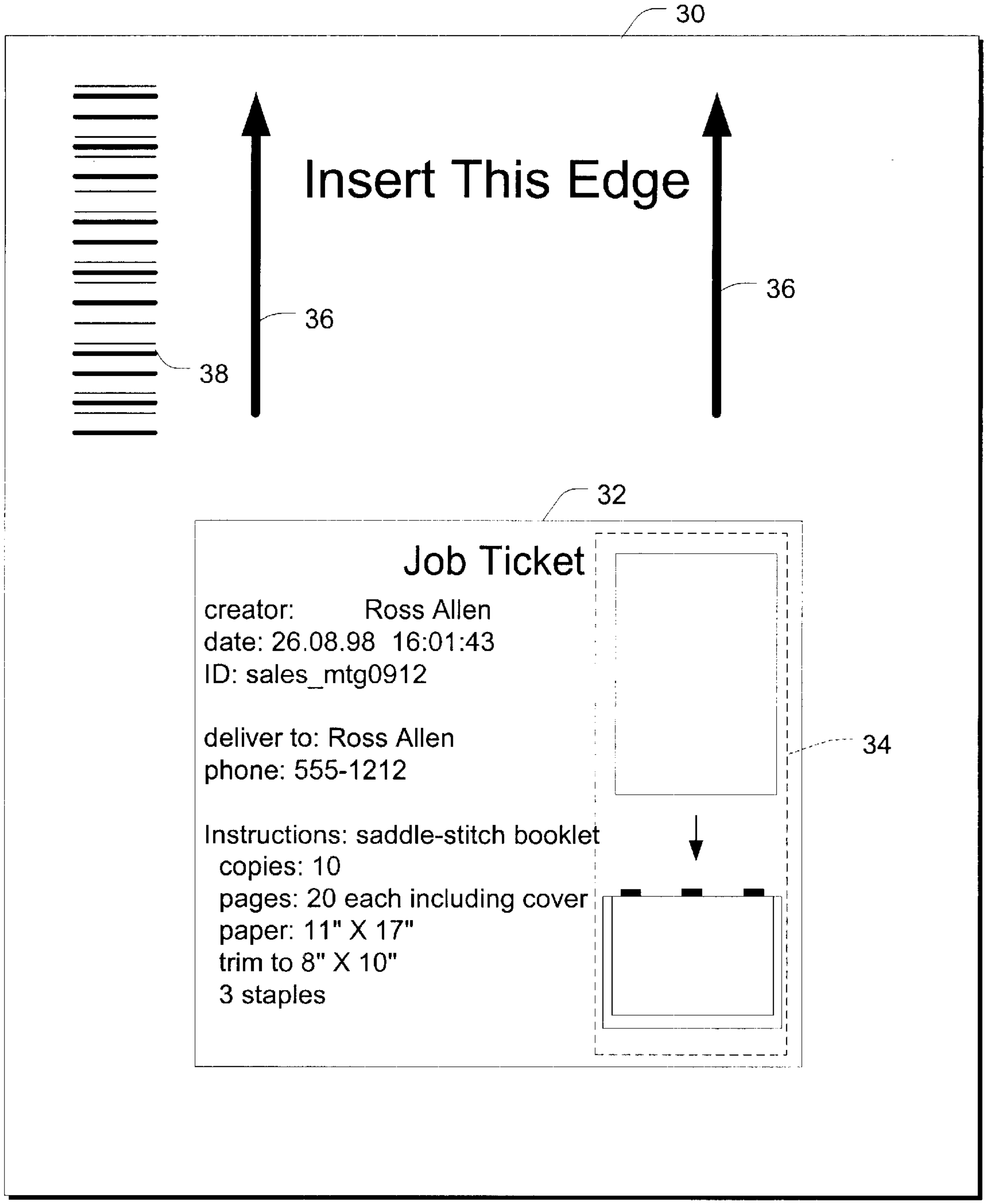
FIG. 2 is a diagram of an instruction sheet in accordance with an embodiment of the invention.

FIG. 2 shows an example of a computer-readable instruction sheet 30 in accordance with one embodiment of the invention. In this embodiment, the instruction sheet includes both human-readable and computer readable or machine-readable instructions. The human-readable instructions are in the form of text and diagrams. Most of this human-readable data is contained with a rectangular box 32, under the title "Job Ticket." An initial instruction "Instructions: saddle-stitch booklet" indicates the general type of finishing and binding that are to be performed. The instruction "copies: 10" indicates the number of documents to be assembled during this print and finishing job. An instruction "pages: 20 each including cover" indicates the number of sheets in each document. The instruction "paper: 11"×17"" indicates paper size. The instruction "trim to "8"×10"" indicates trimming details. The instruction "3 staples" indicates binding details.

Other human-readable instructions within box 32 indicate various information about the finishing job, not necessarily related to finishing details, such as the creator of the document sheets, the date, the recipient of the final job, and the phone number of the recipient. A schematic diagram 34 graphically indicates the nature of the finishing operating that is being specified.

Instruction sheet 30 also has large arrows 36 indicating the correct orientation of the document sheets that are to be submitted to finishing machine 16.

In addition to the human-readable information and instructions, instruction sheet 30 includes a barcode 38 or other machine-readable indicia that is not human-readable, but that is readable by a computer or machine in conjunction with an imaging device. The barcode reflects, in machine-readable format, the instructions in box 32 related to finishing details—such as type of binding, sheets per document, paper size, trimming size, and binding details.

Returning to FIG. 1, the document-producing application program running on computer 12 is programmed to prompt its human operator for information about both printing and finishing details. This operation is typical of a so-called "dialog box" that appears in conjunction with a "print" command.

The computer then prints the document sheets and an associated instruction sheet such as shown in FIG. 2. The document sheets and instruction sheet are deposited on output tray 18 of printer 14. The instruction sheet is printed and positioned, relative to the actual document sheets, so that it will be the first document received by the finishing machine. In most cases, therefore, the instruction sheet will be positioned on top of a stack of document sheets. In this position, the human-readable instructions of the instruction sheet are visible. The arrows 36 are helpful in subsequently positioning the document sheets in input tray 22 of finishing machine 16.

When the document sheets and instruction sheet have been printed and deposited on output tray 18 of printer 14, a human operator 40 manually picks them up, carries them to the finishing machine 16, and deposits them on input tray 22, oriented in accordance with the arrows 36 of the instruction sheet. The operator then interacts with control panel 28 to initiate a finishing operation. However, it is not necessary for the operator to supply finishing details when initializing the finishing operation.

The finishing machine is configured to accept and receive document sheets 20, including instruction sheet 30, and to initially feed instruction sheet 30 into the internal paper processing path of the finishing machine. In FIG. 1, instruction sheet 30 is shown within the internal paper path of finishing machine 16.

In accordance with the invention, finishing machine 16 has a sensor 44 that reads the finishing instructions from the computer-readable instruction sheet. In this embodiment of the invention, sensor 44 is a barcode reader. It is positioned to read barcode 38 of instruction sheet 30 as instruction sheet 30 is fed beneath the barcode reader. The barcode reader may be a reflective optical sensor used to locate an edge of a sheet of paper as it is processed by the finishing machine. Alternatively, the sensor may be fixed on the finishing machine to read the barcode as the sheet is fed through the machine or placed on a moving element of the finishing machine—to thereby scan over the instruction sheet.

Figure 3:
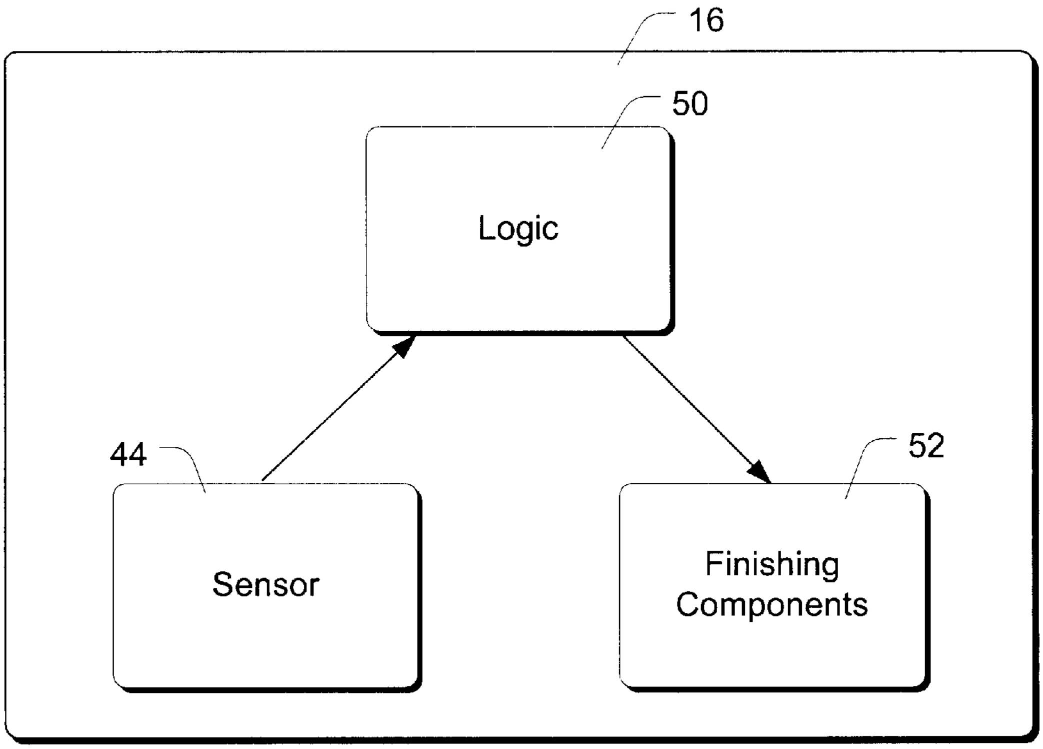
FIG. 3 is a block diagram showing pertinent components of a finishing machine in accordance with an embodiment of the invention.

FIG. 3 shows pertinent components of finishing machine 16 for purposes of discussion. The finishing machine has control logic 50 that controls and coordinates the various finishing tools and components 52 of finishing machine 16. The control logic comprises a microprocessor or other form of embedded computer that is programmed by instructions that are stored in associated electronic memory. These instructions, when executed by the microprocessor, implement the various functions performed by finishing machine 16. The control logic also includes other support components, such as I/O interfaces that allow communications between the microprocessor and various other components of the finishing machine, including its front panel.

Barcode reader 44 is connected to supply barcode information to control logic 50 as the instruction sheet 30 passes beneath the barcode reader. The control logic is programmed to decode the barcode information and to thereby obtain finishing details regarding the document sheets awaiting processing in input tray 22. Once these finishing details are obtained, the instruction sheet is passed through the finishing machine to output tray 24.

In response to reading the instructions from instruction sheet 30, control logic 50 automatically configures finishing machine 16 to process the waiting document sheets 20 in accordance with the instructions on instruction sheet 30. The finishing machine 16 then accepts and processes the document sheets 20 to finish the document specified by the instruction sheet, in accordance with the finishing instructions set forth on the instruction sheet. The finished documents 26 are deposited on output tray 24 of the finishing machine.

In addition to performing finishing steps in accordance with information on the instruction sheet, the instruction sheet can contain further information that is used for communication of job status to other computers or machines and to interested persons. For example, the instruction sheet might indicate an email address of the job "owner." Assuming that the finishing machine is connected to a communications network, the email address is used to email status information to the job owner. Such status might include notifications of job completion and or error conditions.

Although a barcode reader is used in the described embodiment of the invention, sensor 44 might alternatively comprise an optical image scanner configured to image the entire instruction sheet. If so, the computer-readable instructions can be recorded on instruction sheet 30 in some form other than a barcode. For example, optical character recognition can be used to decipher alphanumeric instructions such as those within box 32.

In addition to printing information on an instruction sheet as described above, computer 12 is configured to print finishing-related information on the individual sheets of a document. In particular, computer 12 and printer 14 print computer-readable marks on individual document sheets indicating proper sequencing of the individual sheets within their documents. In addition, such marks can be used to indicate any special operations to be performed on individual sheets. The finishing machine 16 is configured to detect and read these marks to detect out-of-sequence sheets and to perform any special operations specified by the marks.

Figure 4:
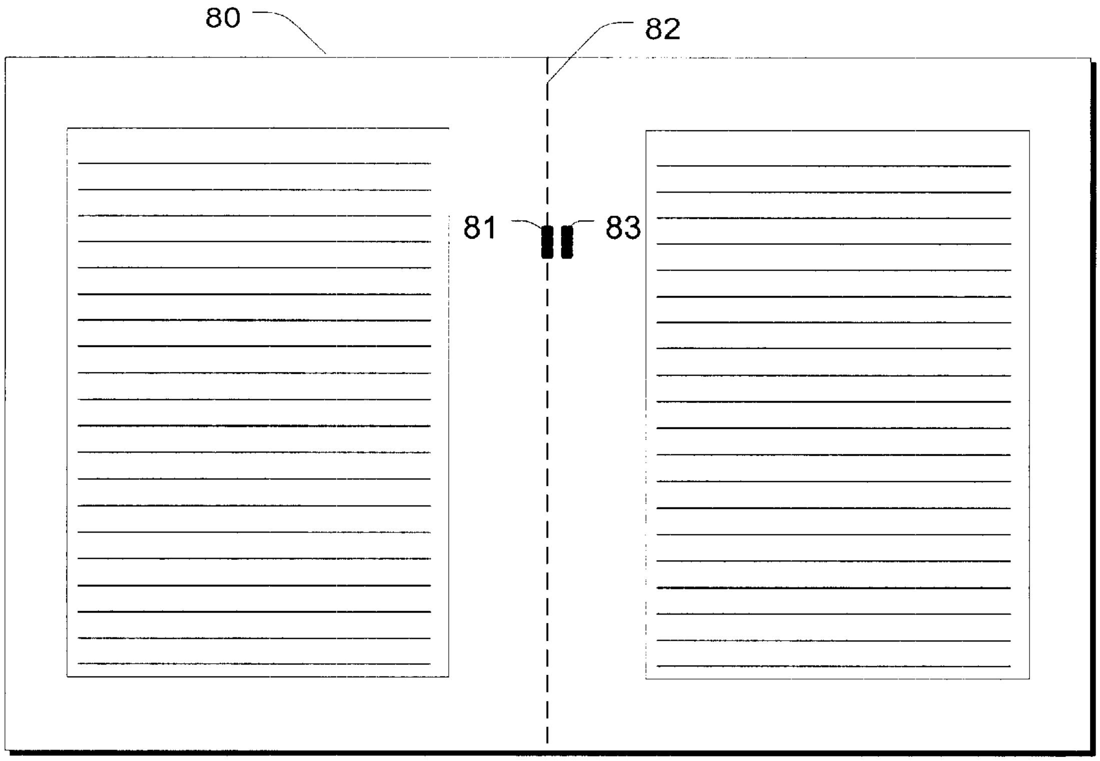
FIG. 4 is a diagram of a document sheet having a sequence mark in accordance with an embodiment of the invention.

Preferably, the marks are printed in such a way that they are either invisible or unnoticeable after the sheets have been assembled and bound in a finished document. For example, the marks are printed along fold lines or in gutters of the individual sheets. FIG. 4 shows an example of a document sheet 80 having a sequence number 81 in machine-readable form printed along a sheet's fold line 82. In this position, the number is inconspicuous in the assembled document, and is often completely obscured as a result of binding the sheet in the document. Sheet marks might alternatively be positioned in areas of the page that will eventually be trimmed from the final document. When using marks such as these, sensor 44 is preferably mounted on an element of the finishing machine that moves across the sheet transverse to the sheet feed direction—such as a cutter, for example.

The presence or absence of the machine-readable sequence number 81 and its actual position on the page provide important information that can be used to verify the quality of the printing process. For example, if the printer is out of ink or toner, the machine-readable sequence number 81 will not appear. This can be used to detect an out-of ink or other writing system failure. The appropriate actions can be taken by the binding machine: in this case, discharging the partially-finished and unfinished pages and halting the finishing process.

If sheet 80 is misfed through a printer, the image on the page will typically be skewed and shifted. For example, the machine-readable sequence number 81 will be shifted to the position illustrated by mark 83. When sequence number 81 is not detected where it is supposed to be found (within acceptable tolerances) by sensor 44, an error condition exists typical of a sheet misfeed. The appropriate actions can be taken by the binding machine: in this case, discharging the partially-finished and unfinished pages and halting the finishing process. Another alternative is to place the marks on areas of the document sheets that are either very unobtrusive or non-visible after the documents are printed—such as in an area where the documents will be stapled.

As a further alternative, sequence marks or numbers might be printed using a non-visible ink, such as an ink that can be read by sensor 44 only upon illumination with a specified light wavelength. A magnetically-detectable ink might also be used for this purpose. In these cases, sensor 44 is specially adapted to detect the specific type of ink being used.

The sequencing mark 81 illustrated might be printed in various formats, such as barcodes, dots, or other patterns that allow finishing machine 16 to detect a proper sequence of document sheets and to detect any other encoded information.

Figure 5:
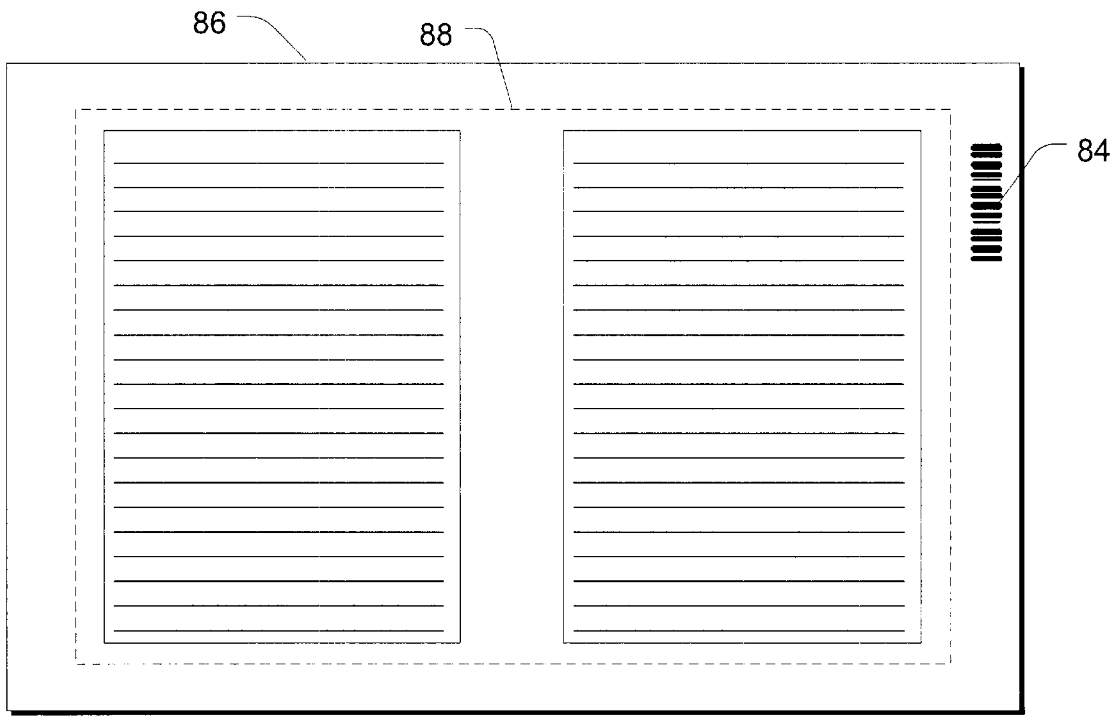
FIG. 5 is a diagram of a document sheet having a barcode in accordance with the invention.

The page sequencing information or other finishing information might alternatively be placed on every page in areas of the page that will eventually be trimmed. FIG. 5 shows an example of this, wherein a barcode (conveying page sequence information and potentially other finishing information) is located within a trimmed area 84 of a document sheet 86. The dashed line. 88 indicates the trimming boundaries, and the barcode is located outside of these boundaries.

Finishing machine 16 is configured to perform a variety of different verifications and to detect various processing errors based on information encoded on and read from the instruction sheet and the individual document sheets. For example, sequencing marks allow the finishing machine to detect out-of-sequence, missing, misaligned, and duplicate pages, provide real-time status of job progress, and to recover correctly from error conditions such as missing pages and paper-jams.

In one embodiment of the invention, each sheet is read with sensor 44 to identify any instruction sheets. The finishing machine is configured to reset its configuration parameters, and to thereby start a new finishing job, whenever encountering a new instruction sheet. In addition, sequence numbers of individual sheets are monitored so that any error in the pages submitted for a particular document is detected. In response to such an error, the finishing machine automatically discharges the partially-finished document and then begins operations on a new document upon encountering the first sheet of the new document, as identified by the sequence number printed on the sheet.

In most cases, the instruction sheet is encoded with instructions that specify the number of documents in a job, and the number of sheets within each document. If another instruction sheet is encountered before the job is finished, the finishing machine generates an error indication.

Although sensor 44 is described as having a dedicated purpose, instruction scanning can in some embodiments be performed by simpler device such as a photodetector or an inexpensive reflective sensor. Such a sensor might also serve as a sheet edge detector to align sheets prior to finishing operations. If this is the case, sheets can be scanned as they are fed into the finisher; the scanning may be multiplexed with other operations such as sheet feed, alignment, and positioning.

Alternatively, a sensor might be fixed at some other location within the finishing machine to read the barcode or other indicia as the sheets are moved past the sensor.

Furthermore, a dedicated sensor might be mounted on a movable finishing tool, such as a cutter, that is used during actual finishing operations. In this case, scanning occurs as the tool performs its finishing operation.

Figure 6:
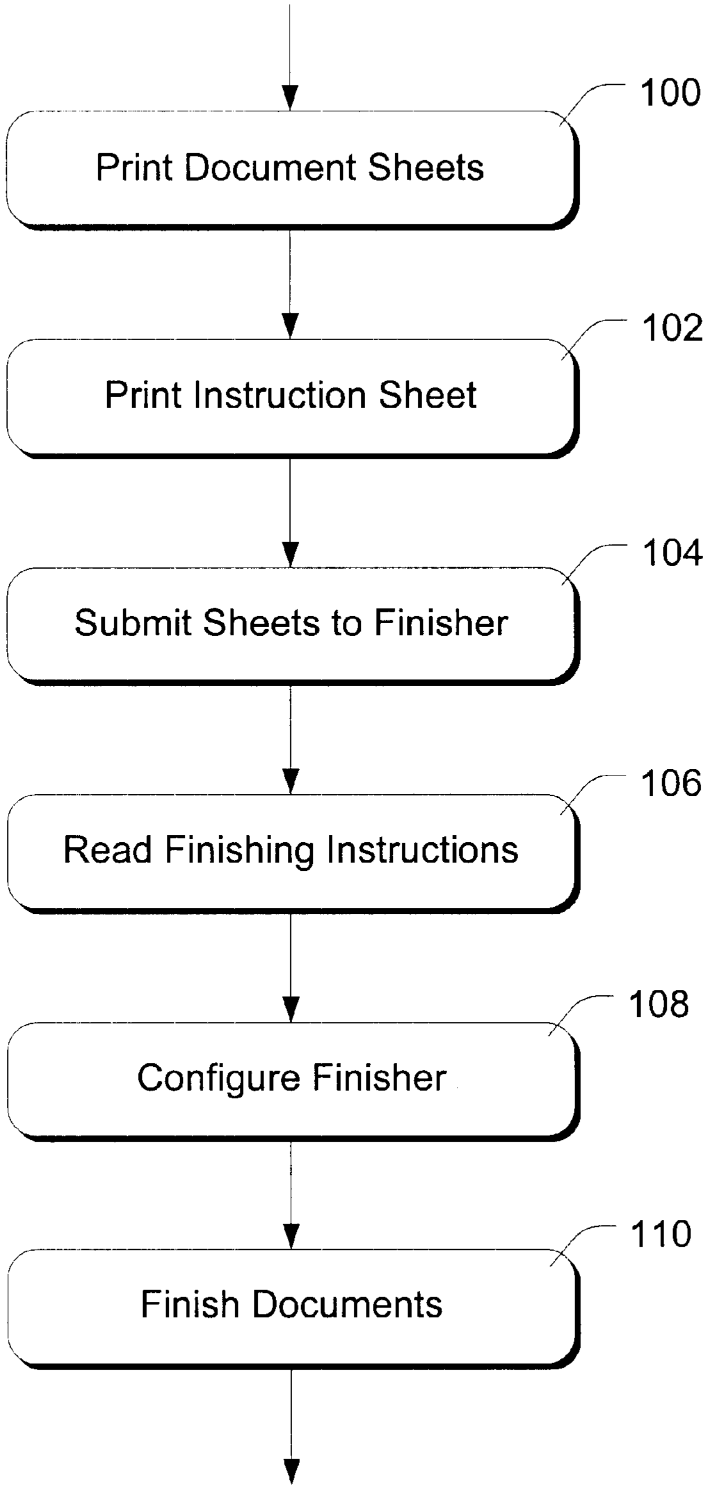
FIG. 6 is a flowchart showing methodological aspects of the invention.

FIG. 6 shows methodological aspects of the invention. A step 100 comprises printing document sheets for one or more documents with a computer and an associated printer. As described above, this step optionally includes a step of printing computer-readable marks on the individual document sheets, indicating finishing details about the individual sheets. For example, the marks might indicate proper sequencing of each sheet relative to other sheets of the same document. The marks might also indicate special steps, such as special trimming for folding operations, that are to be performed on individual sheets.

Step 102 comprises printing finishing instructions on a computer-readable instruction sheet to accompany the document sheets. The finishing instructions indicate the number of documents that are to be assembled from the document sheets, and the number of sheets per document. In addition, the finishing instructions indicate finishing details such as binding, folding, and trimming parameters.

Step 104 comprises manually carrying or otherwise delivering the printed document sheets and the instruction sheet to the finishing machine. Step 106 comprises reading the finishing instructions within the finishing machine, with sensor 44, prior to finishing the documents represented by the submitted sheets.

Step 108, performed in response to reading the finishing instructions, comprises automatically configuring the document finishing machine to finish documents in accordance with the finishing instructions. Step 110 comprises actually performing the finishing operations in accordance with the finishing instructions.

The invention eliminates the confusion that often results in prior art when finishing instructions are communicated orally or through instructions that are interpreted by the operator of the standalone finishing machine. In contrast to the prior art, a single computer is used to both print the document sheets and to unambiguously specify details of the subsequent finishing operations. This integrates the document creation process with the finishing process, without requiring any physical control link between the finishing machine and the computer used in the creation process.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of printing and finishing documents, each document comprising a plurality of document sheets, comprising the following steps:

printing document sheets for one or more documents;

printing finishing instructions on a computer-readable instruction sheet to accompany the document sheets;

submitting the document sheets and the instruction sheet to a document finishing machine;

reading the finishing instructions from the computer-readable instruction sheet with a sensor prior to commencement of the finishing said one or more documents; and in response to reading the finishing instructions from the instruction sheet, automatically configuring the document finishing machine to finish said one or more documents in accordance with the finishing instructions.

2. A method as recited in claim 1, further comprising:

printing non-visible, computer-readable marks on individual document sheets indicating finishing details about such individual document sheets; and reading the computer-readable marks with the document finishing machine to determine the finishing details about the individual document sheets.

3. A method as recited in claim 1, further comprising:

printing non-visible, computer-readable marks at a predetermined location on individual document sheets indicating finishing details about such individual document sheets; and detecting the presence or absence of the computer-readable marks at the predetermined location on the individual documents to detect printing errors.

4. A method as recited in claim 1, further comprising:

printing non-visible, computer-readable marks at a predetermined location on individual document sheets indicating finishing details about such individual document sheets; and detecting the presence or absence of the computer-readable marks at the predetermined location on the individual documents to detect sheet misfeeds.

5. A method as recited in claim 1, further comprising:

printing computer-readable marks on fold lines of individual document sheets indicating finishing details about such individual document sheets;

reading the computer-readable marks with the document finishing machine to determine the finishing details about the individual document sheets.

6. A method as recited in claim 1, further comprising:

printing computer-readable marks on individual document sheets indicating proper sequencing of the individual document sheets;

reading the computer-readable marks with the document finishing machine to detect out-of-sequence document sheets;

discharging a document containing the out-of-sequence document sheets; and initiating finishing on a next document in response to an out-of-sequence document sheet.

7. A method as recited in claim 1, further comprising:

printing computer-readable marks on individual document sheets indicating proper sequencing of individual document sheets;

reading the computer-readable marks with the document finishing machine to detect out-of-sequence document sheets;

automatically starting a new document upon encountering a document sheet that is first in a sequence of document sheets.

8. A method as recited in claim 1, further comprising:

printing computer-readable marks on individual document sheets indicating proper sequencing of individual document sheets;

reading the computer-readable marks with the document finishing machine to detect misaligned document sheets;

automatically starting a new document upon encountering a document sheet that is first in a sequence of document sheets.

9. A method as recited in claim 1, wherein the finishing instructions indicate a number of documents that are to be finished from the printed document sheets and a number of sheets per document.

10. A document printing and finishing system for printing and finishing documents, each document comprising a plurality of document sheets, comprising:

a computer and associated printer;

a document finishing machine;

the computer being programmed to print document sheets with the printer for one or more documents;

the computer being further programmed to print finishing instructions regarding the one or more documents on a computer-readable instruction sheet with the printer;

the document finishing machine being configured to receive the document sheets and the computer-readable instruction sheet;

the document finishing machine having a sensor that reads the finishing instructions from the computer-readable instruction sheet;

the document finishing machine being responsive to the finishing instructions read from the computer-readable instruction sheet to finish said one or more documents in accordance with the finishing instructions.

11. A system as recited in claim 10, wherein the sensor is an optical image scanner.

12. A system as recited in claim 10, wherein the sensor is a barcode reader.

13. A system as recited in claim 10, wherein the sensor is a photodetector.

14. A system as recited in claim 10, wherein the computer is programmed to prompt a human user for finishing instructions prior to printing the instruction sheet.

15. A system as recited in claim 10, wherein the finishing instructions indicate a document sheet count, the document finishing machine being configured to verify the sheet count for each finished document.

16. A system as recited in claim 10, wherein the computer is further programmed to print non-visible, computer-readable marks on individual document sheets indicating finishing details about such individual document sheets.

17. A system as recited in claim 10, wherein the computer is further programmed to print computer-readable marks on fold lines of individual document sheets indicating finishing details about such individual document sheets.

18. A system as recited in claim 10, wherein the computer is further programmed to print computer-readable marks on trim lines of individual document sheets indicating finishing details about such individual document sheets.

19. A system as recited in claim 10, wherein the computer is further programmed to print computer-readable marks at a predetermined location on individual document sheets and the document finishing machine is configured to detect the presence or absence of the computer-readable marks at the predetermined location on the individual documents to detect printing errors.

20. A system as recited in claim 10, wherein the computer is further programmed to print computer-readable marks at a predetermined location on individual document sheets and the document finishing machine is configured to detect the presence or absence of the computer-readable marks at the predetermined location on the individual documents to detect sheet misfeeds.

21. A system as recited in claim 10, wherein the computer is further programmed to print computer-readable marks on individual document sheets indicating finishing details about such individual document sheets, wherein the computer-readable marks are located to be unobtrusive after the document sheets are finished.

22. A system as recited in claim 10, wherein the computer is further programmed to print computer-readable marks on individual document sheets indicating finishing details about such individual document sheets, wherein the computer-readable marks are located to be non-visible after the document sheets are finished.

23. A system as recited in claim 10, wherein the computer is further programmed to print computer-readable marks on individual document sheets indicating proper sequencing of the document sheets within their documents.

24. A system as recited in claim 10, wherein the computer is further programmed to print computer-readable marks on individual document sheets indicating finishing details about such individual document sheets, the document finishing machine being responsive to such marks to detect error conditions.

25. A system as recited in claim 10, wherein the computer is further programmed to print computer-readable marks on individual document sheets indicating proper sequencing of the individual document sheets, the document finishing machine being responsive to such marks to detect out-of-sequence document sheets.

26. A system as recited in claim 10, wherein the computer is further programmed to print computer-readable marks on individual document sheets indicating proper sequencing of individual document sheets, the document finishing machine being responsive to such marks to detect out-of-sequence document sheets and to automatically start a new document upon encountering a document sheet that is first in a sequence of document sheets.

27. A system as recited in claim 10, wherein the finishing instructions indicate a number of sheets per document.

28. A system as recited in claim 10, wherein the finishing instructions indicate a number of documents that are to be finished from the printed document sheets and the number of sheets per document.

29. A system as recited in claim 10, wherein the instruction sheet has human-readable instructions corresponding to the computer-readable instructions.

30. A system as recited in claim 10, further comprising a movable tool that performs a function during finishing, wherein the sensor is mounted on the tool to read the finishing instructions as the movable tool performs its function.

31. A system as recited in claim 10, further comprising a movable tool that performs a finishing function, wherein the sensor is mounted on the tool to read the finishing instructions as the movable tool performs its finishing function.

32. A system as recited in claim 10, wherein the computer is further programmed to print computer-readable marks on portions of the individual document sheets that are trimmed from the document sheets during finishing.

* * * * *